Jan. 22, 1952 J. G. BENSON 2,583,202

VELOCITY INDICATOR FOR MOVING VEHICLES

Filed Aug. 29, 1946

INVENTOR.
JOHN G BENSON

BY *Victor J. Evans & Co.*

ATTORNEYS

Patented Jan. 22, 1952 2,583,202

UNITED STATES PATENT OFFICE 2,583,202

VELOCITY INDICATOR FOR MOVING VEHICLES

John G. Benson, Oswego, N. Y.

Application August 29, 1946, Serial No. 693,656

1 Claim. (Cl. 264—1)

This invention relates to a velocity indicator for moving vehicles.

When a vehicle starts moving from zero velocity, and attains a given positive velocity, the vehicle must go through various stages of acceleration. If this acceleration is measured and integrated with respect to time, the resultant integral will be equal to the velocity at any given time. Acceleration can be measured by the inertia of a mass, and several ways of integrating mechanically have been used and are possible.

An object of this invention is to provide one possible way of performing and combining the functions outlined above in a simple and expeditious manner.

Another object of the invention is to provide a device that requires no external connections or references to enable it to indicate velocity with respect to the ground.

With the above and other objects and advantages in view, the invention consists of the novel details of construction, arrangement and combination of parts more fully hereinafter described, claimed and illustrated in the accompanying drawing in which:

Figure 1:
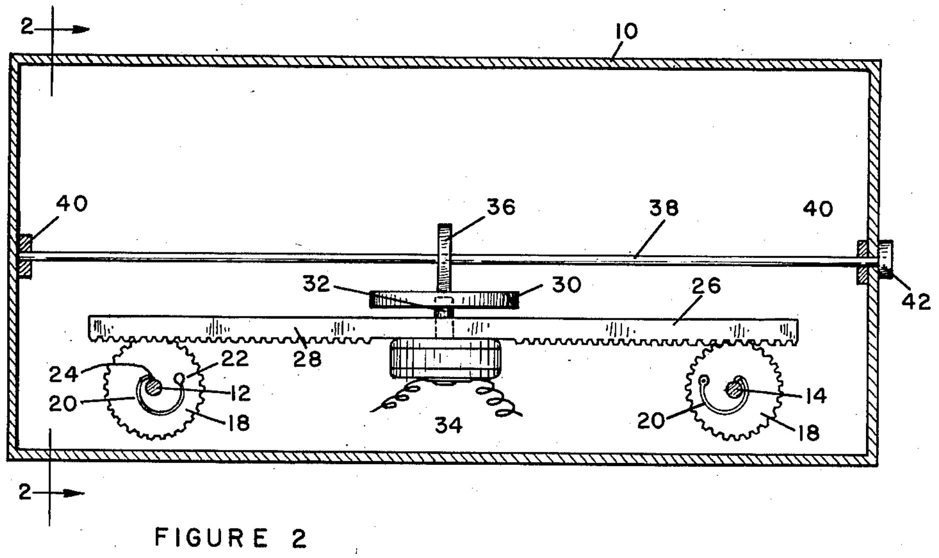
Figure 1 is a longitudinal sectional view of an embodiment of the invention.
Figure 2:
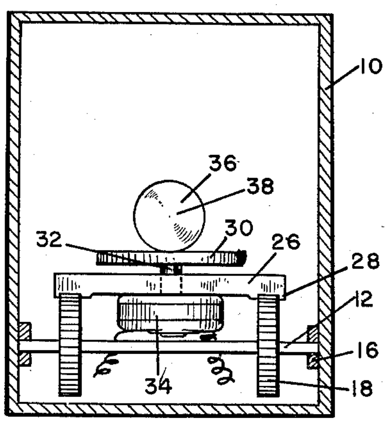
Figure 2 is a sectional view on the line 2—2 of Figure 1.
Figure 3:
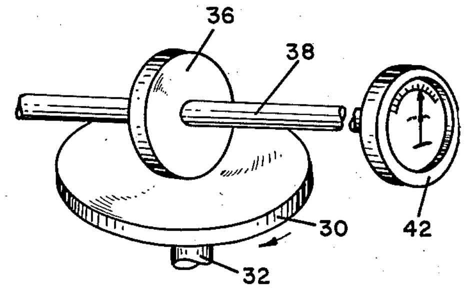
Figure 3 is a perspective view of the integrating assembly.
Figure 4:
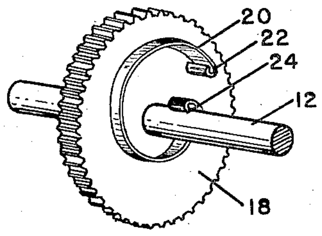
Figure 4 is a perspective view of one of the supporting gears.

Referring more in detail to the drawing, the reference numbered 10 designates the housing for the apparatus, which comprises parallel shafts 12 and 14 which are secured to the inner side walls of the housing by means of bushings 16.

Loosely mounted on the shafts 12 and 14 are the gears 18, there being two gears on each shaft and these gears are free to rotate except for the coiled springs 20 which are secured to the gears at 22 and to the shafts at 24, a pin mounting the spring on the gear at 22 and a slot in the shaft mounting the spring at 24.

A rectangular platform 26 is provided with gear teeth 28 on the under surface thereof for engagement with each of the gears, a circular disc 30 is mounted at the center of the platform 26 by means of the shaft 32 on the electric motor 34 and the motor rotates the disc at a constant speed.

Contacting the flat upper surface of the disc 30 is a second circular disc 36 and the circumference of disc 36 lies in a plane perpendicular to the plane of the disc 30. The disc 36 is fixed to the shaft 38 journalled in bearings 40 secured to the inner end walls of the housing 10, and is so mounted that it has light contact only with the disc 30, such contact and the friction thereof not impeding in any way the motion or movement of the platform 26. When the acceleration is zero, the contact between discs 30 and 36 is at the center of disc 30, and disc 36 shall not be able to move in either direction on the shaft 38 transversely of the disc 30, but shall be free to rotate together with the shaft on which it is mounted with disc 30. A revolution counter 42 is mounted for coaction with one end of the shaft 38 which extends outwardly of the housing so that the counter may be mounted on the outer surface of one of the end walls of the housing, and this counter computes the revolutions of the shaft 38. It can be calibrated to read directly in terms of velocity.

The housing may be mounted on shock absorbers and also mounted so as to point in a given, constant direction. It can also be kept parallel to the axis of the vehicle with automatic correction being made for deviation from the horizontal.

In operation, the device is mounted in the vehicle, with its long axis parallel to the normal direction of movement of the vehicle, and it is to be understood that the vehicle might be any conveyance, such as an airplane, jet or rocket propelled plane or projectile or others. For the purpose of simplicity in explaining its operation, first assume that it is mounted rigidly, and that the vehicle will move so that its axis will remain parallel with the surface of the earth. In other words, the pull of gravity will always be perpendicular to the long axis of the device.

While the vehicle, with the velocity indicator, is still at rest, the constant speed motor of the invention is started running, causing disc 30 to revolve at constant speed. The various parts of the invention are so positioned that at the position of rest, the spring tension of springs 20 holds the movable platform 26 in a neutral, equilibrium position. The disc 36 attached to the horizontal shaft 38 will touch the horizontal rotating disc 30 at its center, and hence will not be rotated by disc 30.

If the vehicle begins to accelerate in the forward direction, the position of the contact between discs 30 and 36 will change, so that disc 36 will no longer be at the center of 30, and will in fact be distant from the center of disc 30, by an amount proportional to the acceleration. During this change of position, the contact is not interrupted, and the discs slide against one another.

Assuming the forward direction to be toward the right, the effect on the relative positions of the parts of the invention will be the same as that caused by a force pushing platform 26 toward the left, this force being proportional to the acceleration of the vehicle.

While the vehicle is accelerating, it can be seen that shaft 38 will be rotated due to the action of disc 30 against disc 36. Also, the speed of rotation of 38 will be proportional to the acceleration. Therefore, the total revolutions of 38, as indicated by the revolution counter, will be proportional to the integral of the acceleration with respect to the time over which it acts. This is simply another way of expressing the velocity of any moving object. When the velocity reaches a constant value (acceleration equals 0), shaft 38 will stop turning. If the vehicle begins to slow down, the contact of 30 and 36 will then be to the left of the center of 30, and shaft 38 will be rotated in the opposite direction, thereby lowering the reading on the revolution counter. The reading on the revolution counter will be directly proportional to the velocity of the vehicle at any given instant.

At the highest acceleration to be expected, the tension of the coil springs 20 should be of such a magnitude that 26 will move a distance such that discs 30 and 36 will still be in contact.

The coil springs are so designed and positioned that the relative movement of the platform with respect to the housing will be proportional to any inter-reacting force between the housing and the platform along a line parallel to the direction of movement of the vehicle. In other words, this movement is proportional to the acceleration of the vehicle, since force equals mass multiplied by acceleration.

The revolution counter 42 is of such a design that, when the direction of rotation of shaft 38 is reversed, the reading on the revolution counter shall be decreased by an equivalent amount.

Platform 26 can move either to the left or to the right of its neutral position.

In practice, the invention may or may not be rigidly mounted in the vehicle. If it is desired to measure the speed of the vehicle along its own axis, regardless of its angle with the earth's surface, the rigid mounting should be chosen. The use of the word "rigid" here is meant to imply that the indicator cannot change its angular relationship with the vehicle, but may be mounted on shock absorbers to reduce the effect due to jarring of the vehicle or other extraneous vibrations.

If the vehicle is not parallel to the earth's surface at all times, some device similar to a gyroscopic artificial horizon must be incorporated with the velocity indicating device, to provide automatic, instantaneous corrections due to the varying effect of gravity on the movable platform and constant speed motor assembly. One means of providing this compensating effect would be to have the artificial horizon mechanism arranged so as to control the longitudinal position of disc 36 along shaft 38, thus providing a compensating effect. For instance, if the device while at rest were tilted down at the right, the movable platform 28 would roll a certain distance toward the right, due to gravity. If no correction were applied, the result on the reading of velocity would be the same as that due to a negative acceleration. Now, if disc 36 is moved to the right by an amount proportional to the effect of gravity on the platform 28, it would still maintain contact with disc 36 at the center of disc 30, and a true reading on the velocity indicator would be maintained.

A second method of mounting the invention would be possible, where the object is to measure the velocity of the vehicle in a given, predetermined direction. In this case, the invention would be mounted on a double set of gimbals at right angles to each other. A gyroscopic device attached to the invention would keep the invention pointing in its original, predetermined direction without regard to the angle of the vehicle.

The above description, it is believed, will clearly explain the operation and construction of the invention to those skilled in the art, and it is to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

A device of the character described, for computing velocity, comprising a housing, parallel opposed shafts mounted transversely of said housing, parallel gears on said shafts, springs connected to said gears and said shafts for tensioning said gears, a platform mounted above said gears, gear teeth on the under-surface of said platform engaging said gears for the mounting thereof, a disc mounted in the center of said platform, a shaft mounting said disc at its upper end, an electric motor rotating at a predetermined fixed speed on the lower end of said shaft, a disc engaging said first disc, the circumference of said second disc being in a plane perpendicular to said first disc, a shaft for mounting said second disc and a velocity indicator on one end of said shaft.

JOHN G. BENSON.

REFERENCES CITED

The following references are of record in the file of this patent:

UNITED STATES PATENTS

| Number | Name | Date |
|---|---|---|
| 1,280,508 | McHenry | Oct. 1, 1918 |
| 1,451,923 | Pierce | Apr. 17, 1923 |
| 1,924,658 | Sanders | Aug. 29, 1933 |
| 2,193,707 | Baumann | Mar. 12, 1940 |
| 2,458,016 | Morrison | Jan. 4, 1949 |

FOREIGN PATENTS

| Number | Country | Date |
|---|---|---|
| 46,402 | Austria | Feb. 10, 1911 |
| 124,318 | Great Britain | Mar. 27, 1919 |
| 434,708 | Great Britain | Sept. 6, 1935 |
| 348,703 | Italy | May 26, 1937 |